(12) United States Patent
Flolo

(10) Patent No.: US 9,427,807 B2
(45) Date of Patent: Aug. 30, 2016

(54) CLAMP TO HOLD A CUTTING INSERT ON A TOOL HOLDER

(71) Applicant: Tool Flo Manufacturing, Inc., Houston, TX (US)

(72) Inventor: Dennis P. Flolo, Kemah, TX (US)

(73) Assignee: Dennis P. Flolo, Kemah, TX (US)

( * ) Notice: Subject to any disclaimer, the term of this patent is extended or adjusted under 35 U.S.C. 154(b) by 548 days.

(21) Appl. No.: 13/893,071

(22) Filed: May 13, 2013

(65) Prior Publication Data

US 2014/0334887 A1 Nov. 13, 2014

(51) Int. Cl.
*B23B 27/10* (2006.01)
*B23B 27/16* (2006.01)
*B23C 5/28* (2006.01)

(52) U.S. Cl.
CPC ........... *B23B 27/10* (2013.01); *B23B 27/1666* (2013.01); *B23B 2250/12* (2013.01); *B23B 2260/03* (2013.01); *Y10T 407/14* (2015.01)

(58) Field of Classification Search
CPC ..... Y10T 7/14; B23B 27/10; B23B 2205/00; B23B 2250/12
See application file for complete search history.

(56) References Cited

U.S. PATENT DOCUMENTS

| | | | |
|---|---|---|---|
| 3,399,442 A | 9/1968 | Jones et al. | |
| 3,754,309 A * | 8/1973 | Jones | B23B 27/007 407/107 |
| 3,762,005 A | 10/1973 | Erkfritz | |
| 4,621,547 A * | 11/1986 | Yankoff | B23B 27/167 407/11 |
| 4,834,592 A | 5/1989 | Niebauer et al. | |
| 4,848,198 A * | 7/1989 | Royal | B23B 25/02 407/11 |
| 6,045,300 A * | 4/2000 | Antoun | B23B 27/10 407/11 |
| 8,388,268 B2 * | 3/2013 | Henry | B23B 27/10 407/101 |
| 8,826,786 B2 * | 9/2014 | Amstibovitsky | B23B 27/10 407/11 |
| 2006/0140728 A1 * | 6/2006 | Giannetti | B23B 27/10 407/11 |
| 2011/0020074 A1 * | 1/2011 | Chen | B23B 27/10 407/11 |
| 2011/0311323 A1 * | 12/2011 | Hecht | B23B 27/1677 407/11 |
| 2013/0051934 A1 * | 2/2013 | Henry | B23B 27/10 407/11 |
| 2013/0078043 A1 * | 3/2013 | Henry | B23B 27/1622 407/11 |
| 2015/0132074 A1 * | 5/2015 | Boissonnet | B23B 27/10 407/11 |

FOREIGN PATENT DOCUMENTS

EP 1363542 A1 9/2002

* cited by examiner

*Primary Examiner* — Will Fridie, Jr.
(74) *Attorney, Agent, or Firm* — Patrick K. Steele; Jeffrey L. Streets; Streets & Steele

(57) ABSTRACT

A clamp for holding a cutting insert on a tool holder and having a coolant passage therethrough to receive a coolant from a coolant supply conduit external to the tool holder and into an inlet of the clamp, and to impinge a coolant stream emerging from an outlet of the coolant passage onto a cutting interface between the cutting insert and a work piece. The flow of coolant through the coolant passage extends the life of the cutting insert by reducing heat generation at the cutting interface between the cutting edge of the cutting insert and the work piece. The coolant passage can be formed using conventional drilling tools. The clamp enables the extension of the service life of a cutting insert and can be used with conventional tool holders.

9 Claims, 5 Drawing Sheets

CLAMP TO HOLD A CUTTING INSERT ON A TOOL HOLDER

FIELD OF THE INVENTION

This application relates to a tool for removing material from a work piece, such as a metal work piece. More specifically, this application relates to a clamp to hold a cutting insert on a tool holder that is positionable to engage the cutting insert with a work piece to remove chips of material from the work piece.

BACKGROUND

Background of the Related Art

The present invention relates to a clamp to hold a cutting inserts on a tool holder. Cutting inserts are detachably clamped on a tool holder that is controllably positionable relative to a work piece, generally a rotatable work piece. The work piece may rotate as the tool holder positions the cutting insert to engage the exterior of the work piece and to cut or remove chips of material from the work piece to obtain a desired exterior shape.

Cutting inserts are often made with a plurality of cutting edges. The provision of two or more cutting edges on an insert makes the cutting insert more economical to use. The cutting insert is generally discarded when it becomes dull or chipped, and the life of a cutting insert is generally shortened by high temperatures at which a cutting insert is used.

A cutting insert must be securely held in place in a pocket on a tool holder during the cutting operation. When the inserts are of a substantial area, it is possible to fix the insert both accurately and firmly within the pocket of a tool holder by providing the insert with a central hole and the tool holder with a pin-type clamping device. In other cases, such inserts may be held in place by a top clamp. Examples of such holders are found in U.S. Pat. Nos. 3,754,309; 3,399,442; 3,762,005 and 4,834,592 and British Patent No. 1,363,542.

The main object of metal machining is the shaping of the exterior surface of the work piece. Much attention is paid to the formation of chips during the machining process, even though the chip is a waste product. The work piece is generally rotated using a spindle powered to rotate by a motor. The motor provides the power to keep the work piece turning at a generally uniform rate notwithstanding the drag and friction introduced by engagement of the cutting insert with the exterior surface of the work piece. The consumption of energy and the generation of heat occur mainly in the formation of metal chips.

BRIEF SUMMARY

One embodiment of the present invention comprises a clamp to secure a cutting insert to a tool holder, the clamp being connectable to a coolant supply conduit that is external to the tool holder and comprising a proximal portion with a toe, a distal portion with a heel, an aperture intermediate the proximal portion and the distal portion to receive a fastener, such as a screw or bolt, through the clamp to engage a hole in the tool holder, and a coolant passage having an inlet to the coolant passage in the distal portion of the clamp to receive a flow of coolant from the coolant supply conduit, an outlet from the coolant passage in a proximal portion of the clamp to direct a stream of coolant to impinge on the work piece adjacent to a cutting interface between a cutting edge of the cutting insert and a work piece engaged thereby, and an intermediate portion of the coolant passage between the inlet and the outlet and passing laterally to the aperture of the clamp, wherein the toe on the proximal portion of the clamp engages a receiving groove on the cutting insert to secure the cutting insert in position on the tool holder and against dislodgment from the forces applied by engagement of the cutting insert with the work piece, wherein the heel on the distal portion of the clamp engages a receiving détente to position the clamp relative to the tool holder, wherein the flow of coolant through the coolant passage of the clamp, at coolant temperatures at or near ambient temperature or below, lubricates the cutting interface to reduce the amount of heat generated at the interface and transferred to the cutting insert held in place on the tool holder using the clamp. A secondary benefit of coolant flow through the coolant passage of the clamp is that heat can be removed from the clamp to the coolant flow stream.

Another embodiment of the present invention provides a threaded inlet in the distal portion of the clamp to connect the coolant supply conduit that is external to the tool holder. The coolant supply conduit connects to the threaded inlet of the clamp using a threaded end connection, and provides a flow of coolant from the coolant supply conduit, through the threaded end connection on the coolant supply conduit, through the inlet and the coolant passage of the clamp to the outlet.

Another embodiment of the present invention provides a plurality of inlets in the distal portion of the clamp to enable the connection of the threaded end connection on the coolant supply conduit to a selected inlet on the clamp. This embodiment provides flexibility so that the coolant supply conduit can be connected to the clamp without crossing the coolant supply conduit over the tool holder or without otherwise impairing access to the fastener that secures the clamp to the tool holder. An inlet that is not in use can be isolated using a threaded plug.

Embodiments of the present invention generally require that the clamp be rigid, made of a material that can be forcibly secured to the tool holder using a fastener and securable on a tool holder without substantial flexure so that the cutting insert is held fast against movement by forces generated in removing chips of material from the work piece. The coolant passage in the clamp can be formed in segments using a drill bit of sufficient hardness. For example, tungsten carbide drill bits are suitable for drilling segment of the coolant passage in the clamp. A drill bit is generally useful for forming only straight channels, and the formation of the coolant passage using drill bits may require the formation in the clamp of a plurality of intersecting channel segments that together form the coolant passage.

Embodiments of the clamp of the present invention include an outlet from the coolant passage directed to impinge a stream of coolant onto the cutting interface between the cutting edge of the cutting insert and the work piece. The impingement of the stream of coolant lubricates and cools the cutting interface. The lubrication effect reduces the overall amount of heat generated in the cutting insert as a result of the formation and removal of chips of material. The continuous flow of coolant through the coolant passage in the clamp also removes some heat from the clamp and thereby has an additional cooling effect on the cutting insert. The resulting operating temperature of the cutting insert is reduced and the life of the cutting insert is increased. Preferably, the outlet of the coolant passage in the clamp is directed to impinge a stream of coolant on the cutting interface below a chip of material as it is being formed by removal of material from the work piece and above the cutting edge of the cutting insert. Impingement of the stream of coolant below the chip being removed and above the cutting edge of the cutting insert provides the most beneficial lubrication and reduction in heat generated by the machining process.

Embodiments of the clamp of the present invention may be advantageously used with existing tool holders and with existing inventories of cutting inserts to save substantial costs. In one embodiment, the clamp of the present invention comprises two inlets, each of which is in coolant communication with the coolant passage through the clamp to enable connection to a coolant supply conduit from either side. In this embodiment, an inlet that is not connected to the coolant supply conduit may be closed using a threaded plug.

DETAILED DESCRIPTION

Figure 1:
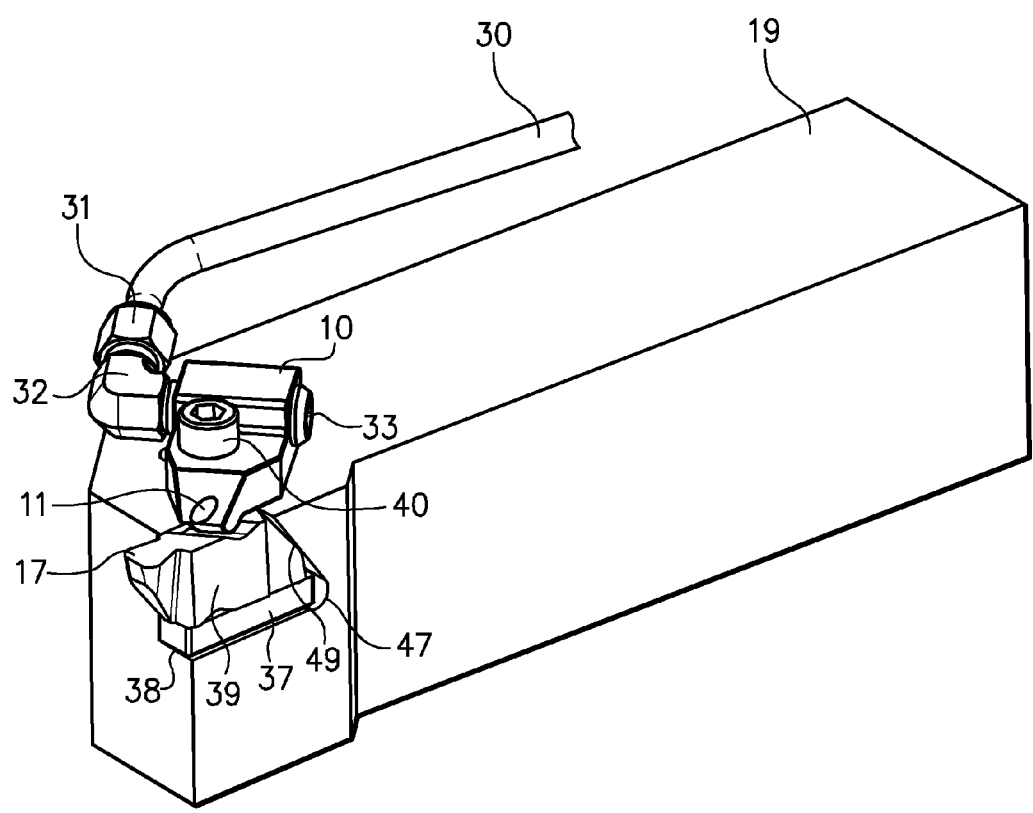
FIG. 1 is a perspective view of a conventional tool holder having a pocket in which a cutting insert is received and secured using a clamp of the present invention.

FIG. 1 is a perspective view of a conventional tool holder 19 having a pocket 47 therein which a cutting insert 39 is received and secured using a clamp 10 of the present invention. The tool holder 19 is generally connected to and controllably movable using, for example, precision hydraulics (not shown) that provide for smooth and reliable positioning of the cutting insert 39 secured in the pocket 47 for movement with the tool holder 19 relative to the work piece (not shown) from which material chips are removed using the cutting insert 39. A support member 37 may be received into the pocket 47 and supported on the floor 38 of the pocket 47 prior to receiving the cutting insert 39 to act as a buffer or cushion between the cutting insert 39 and the pocket 47 and to prevent unwanted deformation of the pocket 47. It will be noted that the pocket 47 has a rear wall 49 at an angle to the floor 38 to better secure the cutting insert 39 in the pocket 47.

The tool holder 19 comprises a threaded hole (not shown) to receive a fastener 40. The clamp 10 of the present invention comprises an aperture 12 (not shown in FIG. 1) to receive the fastener 40 to secure the clamp 10 to the tool holder 19 at the threaded hole (not shown). In the embodiment of the clamp 10 of FIG. 1, the clamp 10 comprises a first inlet (not shown in FIG. 1) having threads for being sealably connected to a threaded fitting 32 on an end 31 of the coolant supply conduit 30. The clamp 10 of FIG. 1 further comprises a second inlet (not shown), generally opposite the first inlet, and having threads (not shown) for being sealably connected to a threaded plug 33 to close the second inlet while not in use. It will be understood that the provision of the first inlet and the second inlet in the clamp 10 enables the convenient connection of the coolant supply conduit 30 on either side of the clamp 10. It will be further understood that embodiments of the clamp 10 of the present invention may comprise only a single inlet. The clamp 10 of FIG. 1 comprises an outlet 11 directed to impinge a coolant stream provided from the coolant supply conduit 30, and through a coolant passage (not shown in FIG. 1) in the clamp 10, onto a cutting interface between the cutting edge 17 of the cutting insert 39 and the work piece (not shown).

Figure 2:
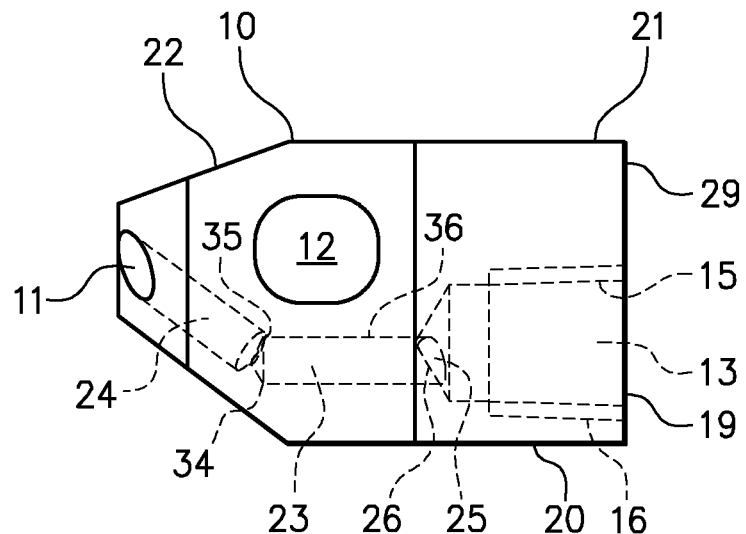
FIG. 2 is a plan view of an embodiment of a clamp of the present invention.

FIG. 2 is a plan view of another embodiment of the clamp 10 of the present invention with dotted lines used to reveal internal structures. The clamp 10 of FIG. 2 comprises a first lateral side 20, a second lateral side 21, a distal wall 19 along a distal portion 29 of the clamp 10, a coolant passage 36 fluidically connected, at a first end, to an inlet 13 in the distal portion 29 of the clamp 10 that is adapted to sealably receive a threaded fitting 32 (not shown in FIG. 2—see FIG. 1) on the end 31 of the coolant supply conduit 30. The coolant passage 36 is fluidically connected at a second end to the outlet 11 in a proximal portion 22 of the clamp 10. The outlet 11 is directed to impinge a stream of coolant emerging from the coolant passage 36 onto an interface between the cutting edge 17 (not shown in FIG. 2—see FIG. 1) of the cutting insert 39 and the work piece (not shown). The clamp 10 of FIG. 2 further comprises an aperture 12 to receive a fastener 40 (not shown in FIG. 2—see FIG. 1). The aperture 12 is intermediate the proximal portion 22 and the distal portion 29 of the clamp 10. The inlet 13 comprises a well 16 having threads 15 provided therein for making up a sealed threaded connection with the threaded fitting 32 (not shown in FIG. 2—see FIG. 1) on the end 31 of the coolant supply conduit 30.

Figure 4:
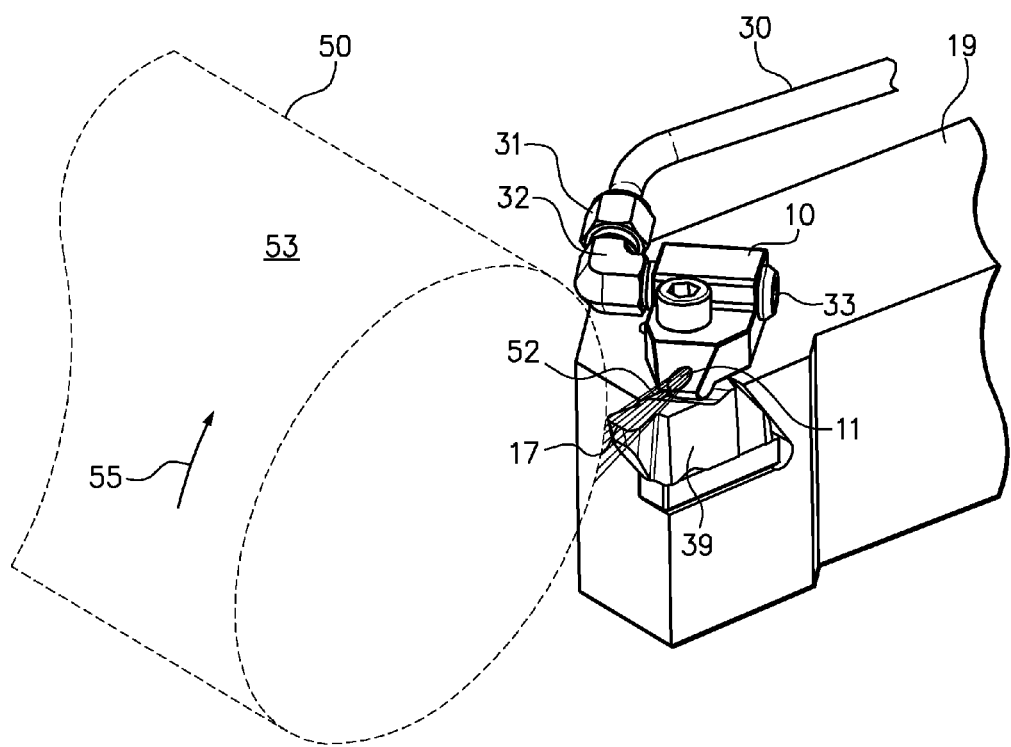
FIG. 4 is the perspective view of FIG. 1 with dotted lines illustrating the position of a portion of a work piece to be engaged by the cutting insert held on the tool holder by an embodiment of the clamp of the present invention.

It will be understood that the position of the outlet 11 of the coolant passage 36 of the clamp 10 relative to the cutting edge 17 of the cutting insert 39, and the direction of the coolant stream emerging from the outlet 11 of the coolant passage 36 of the clamp 10, together determine the location on a work piece (not shown) at which the coolant stream impinges upon the work piece. This concept is illustrated in FIG. 4 and discussed further below. The clamp 10 of the present invention is adapted to impinge the coolant stream emerging from the outlet 11 at a location on the work piece below the chip being removed and above the cutting edge 17 of the cutting insert 39. This strategic placement of the coolant stream provided by embodiments of the present invention prevents unwanted shielding of the cutting edge 17 of the cutting insert 39 by the chip of material being removed from the work piece which acts as an umbrella to impede a stream introduced from a position above the clamp 10.

The position of the outlet 11 and the direction of the coolant stream emerging therefrom is determined by the physical configuration of the clamp 10. The coolant passage 36 includes an intermediate channel 23 and an outlet channel 24 terminating at the outlet 11. It will be understood that the inlet 13, the intermediate channel 23 and the outlet channel 24 that together make up the coolant passage 36 in the clamp of FIG. 2 may be formed using a conventional drill bit (not shown), and that a drill bit generally includes a conical or beveled tip that provides better penetration and chip removal during the drilling process. A conventional drill bit will, therefore, bore generally straight channels terminating at conical or beveled portions 34 and 26. It will be understood that, in FIG. 2, intermediate channel 23 can be drilled from and through well 16 of the inlet 13, and that intersecting outlet channel 24 can be drilled by initially creating the outlet 11 and then extending the outlet 11 to form outlet channel 24 to intersect with intermediate channel 23 at intersection 35. Intermediate channel 23 and the well 16 of the inlet 13 intersect at intersection 25.

Figure 3:
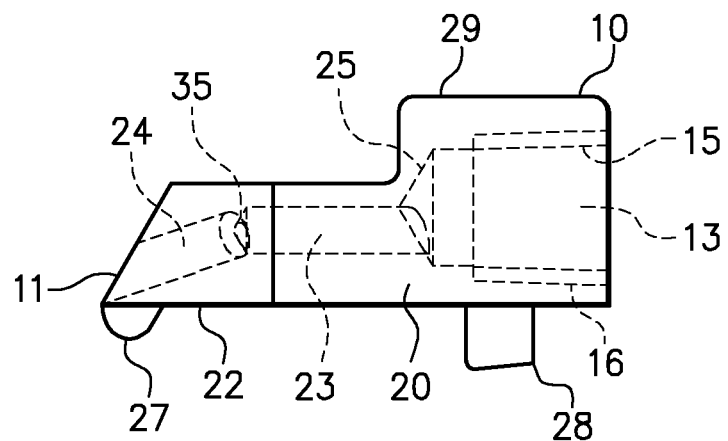
FIG. 3 is an elevation view of the clamp of FIG. 2.

FIG. 3 is an elevation view of the clamp 10 of FIG. 2 as seen from the first lateral side 20 (as shown in FIG. 2) and illustrating the internal structures. The inlet 13 in the distal portion 29 includes the well 16 and the threads 15 therein, and the proximal portion 22 includes the outlet channel 24. The intermediate channel 23 fluidically connects to the inlet 13 at intersection 25 and to the outlet channel 24 at intersection 35. The intermediate channel 23 passes from the distal portion 29 to the proximal portion 22 laterally to the aperture 12 (see plan view in FIG. 2). The aperture 12 that receives the fastener 40 (see FIG. 2) is not shown in FIG. 3 but is behind the intermediate channel 23 revealed in FIG. 3. The strategic placement and sizing of the inlet 13, the intermediate channel 23 and the outlet channel 24 within the clamp 10 of FIG. 3 will maximize the capacity of the clamp 10 to sustain a load applied downwardly on the clamp 10 by the fastener 40 (see FIG. 1) and transferred through the clamp 10 to bear on the heel 28 and to the toe 27 to secure the cutting insert 39 (not shown in FIG. 3—see FIG. 1) to the tool holder 19.

FIG. 4 is the perspective view of FIG. 1 with a portion of a work piece 50 in dotted lines to illustrate the position of a work piece 50 engaged by the cutting insert 39 secured on the tool holder 19 by the clamp 10. The work piece 50 is supported on a spindle (not shown) that rotates the work piece 50 to move an exterior surface 53 of work piece 50 in the direction of arrow 55 as the cutting edge 17 of the cutting insert 39 engages the exterior surface 53 of the work piece 50 to remove material therefrom by the formation of chips (not shown). The coolant stream 52 emerging from the outlet 11 of the clamp 10 is directed to impinge on the cutting interface between the cutting edge 17 and the exterior surface 53 of the work piece 50. The clamp 10 of FIG. 4 includes a plug 33 sealably received in a second inlet (not shown) to accommodate connection of the threaded fitting 32 at the end 31 of the coolant supply conduit 30 on either side of the clamp 10.

Figure 5:
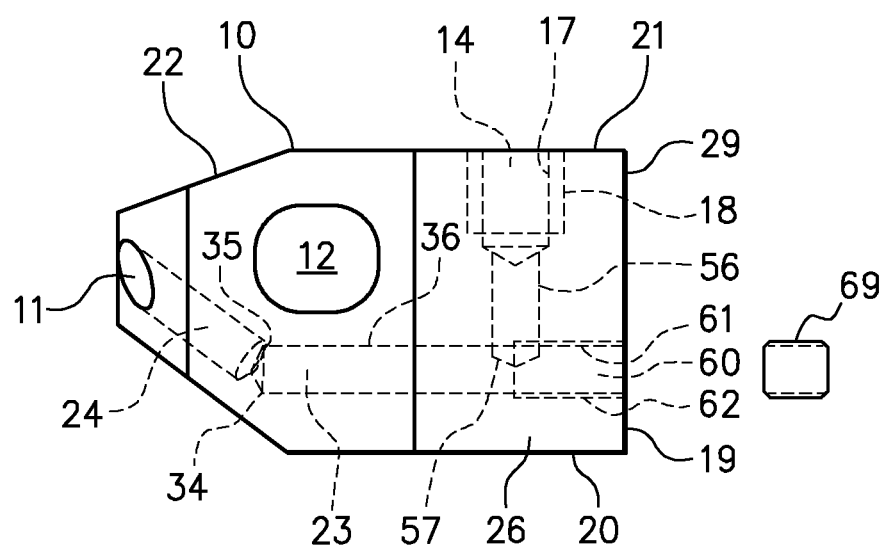
FIG. 5 is a plan view of an alternative embodiment of the clamp of the present invention.

FIG. 5 is a plan view of an alternative clamp 10 of the present invention in which an alternate location of the inlet 14 to the coolant passage 36 is illustrated. The clamp 10 of FIG. 5 includes a proximal portion 22 and a distal portion 29, a first side 20 and a second side 21, and an aperture 12 therebetween to receive a fastener (not shown). The inlet 14 remains in the distal portion 29 of the clamp 10, but does not open into the distal wall 19 of the clamp 10. In the embodiment of FIG. 5, the coolant passage 36 comprises the inlet 14, which includes a well 18 and threads 17 therein, an initial channel 56 drilled into the distal portion of the clamp 10 from the inlet 14 to establish coolant communication between with the intermediate channel 23 at intersection 57. Intermediate channel 23 is bored from the distal wall 19 of the clamp 10 through a drilling access bore 60 having a well 62 with threads 61 therein to receive a threaded plug 69 to close the drilling access bore 60 and to isolate the coolant passage 36 to communicate only with the inlet 14 and the outlet 11 connected thereto. The intermediate channel 23 is connected to the outlet channel 24 at intersection 34.

Figure 6:
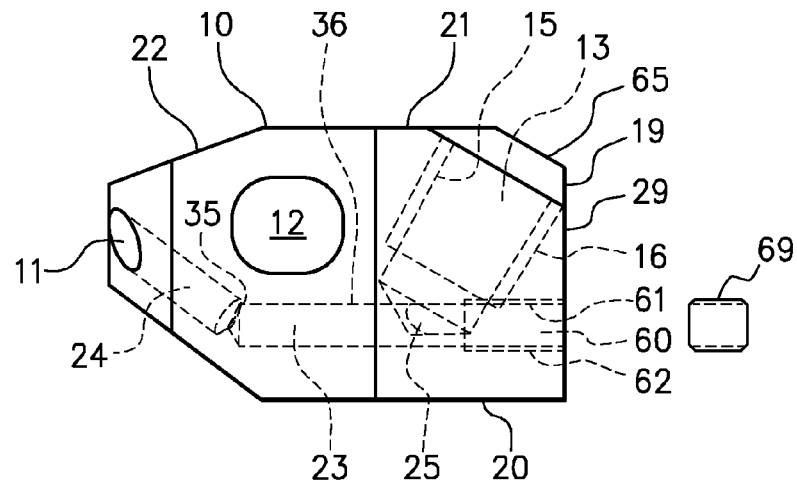
FIG. 6 is a plan view of another alternative embodiment of the clamp of the present invention.

FIG. 6 is another alternate embodiment of the clamp 10 of the present invention including an inlet 13 disposed at an angle to the second side 21 and also to the distal wall 19 of the distal portion 29 of the clamp 10 to accommodate a different angle and configuration for the connection of the coolant supply conduit 30 (not shown) and the threaded fitting 32 at the end 31 of the coolant supply conduit 30 (not shown). The embodiment of the clamp 10 of FIG. 6 comprises an aperture 12 to receive a fastener (now shown) and a coolant passage 36 extending from the inlet 13 to the outlet 11, and passing laterally to the aperture 12. The coolant passage 36 comprises the inlet 13, having a well 16 and threads 15, an intermediate channel 23 passing between a first side 20 and the aperture 12 and laterally to the aperture 12, an outlet channel 24 and the outlet 11. The intermediate channel 23 is connected at an intersection 25 to the inlet 13 and at an intersection 35 to the outlet channel 24. The clamp 10 of FIG. 6 further comprises a drilling access bore 60 having a well 62 with threads 61 to receive and mate with a threaded plug 69 to close the drilling access bore 60 and to isolate the coolant passage 36 to communicate only with the inlet 13 and the outlet 11 connected thereto. It will be understood that the drilling access bore 60 is provided to enable the drilling of the intermediate channel 23 of the coolant passage 36. The embodiment of the clamp 10 of FIG. 6 further comprises a shelf 65 to align and position a threaded fitting 32 (see FIG. 1) for being threadably connected to the adjacent inlet 13.

Figure 7:
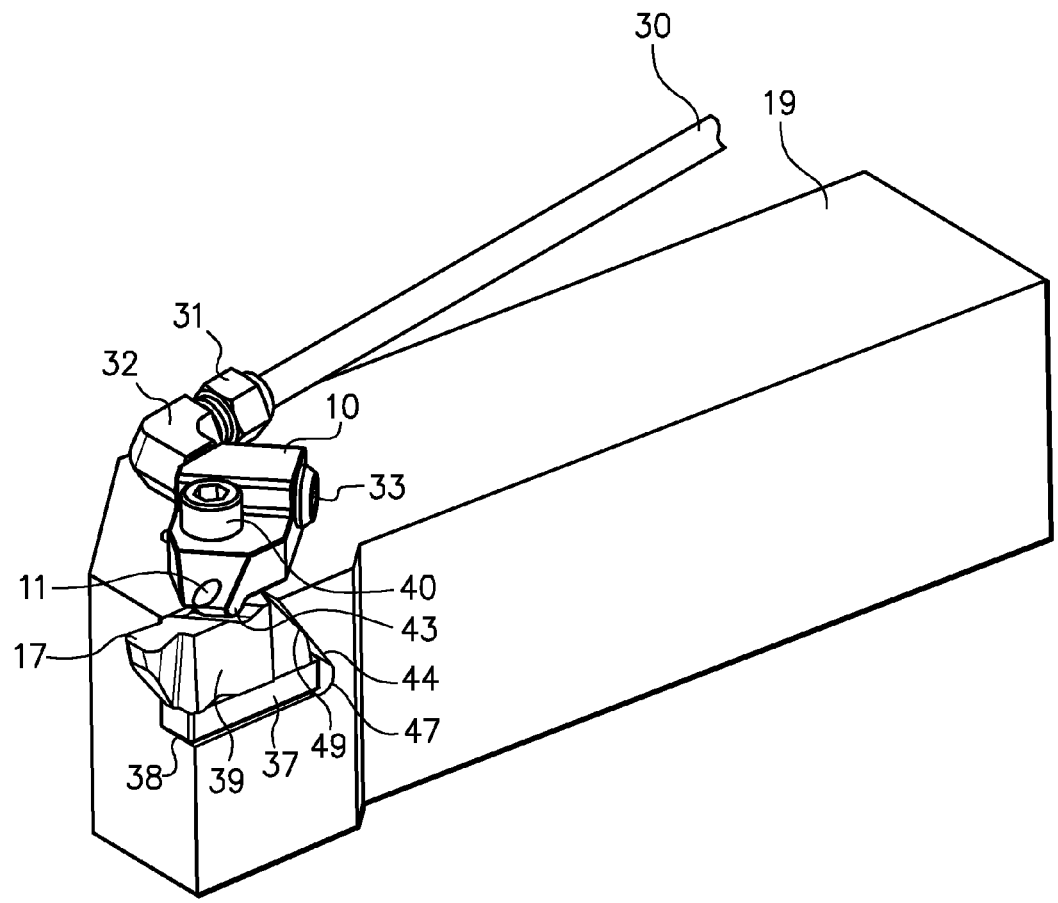
FIG. 7 is a perspective view of a conventional tool holder having a pocket in which a cutting insert is received and secured using the alternative embodiment of the clamp of FIG. 6.

FIG. 7 is a perspective view of another embodiment of the clamp 10 of the present invention secured in a pocket 47 of a conventional tool holder 19 using a fastener 40 received through the aperture 12 (not shown in FIG. 7) of the clamp 10. The clamp 10 of FIG. 7 has an angled inlet (not shown in FIG. 7), like the embodiment of the clamp 10 of FIG. 6, but includes a second inlet (not shown) closed using a plug 33. It will be understood that the angled inlet 13 (not shown in FIG. 7) allows the threaded fitting 32 on the end 31 of the coolant supply conduit 30 to be connected to the clamp 10 without unwanted bends in the coolant supply conduit 30.

It will be understood that the clamp of the present invention may comprise a conductive material suitable for optimizing heat transfer from the cutting insert to the clamp and/or to optimize heat transfer from the clamp to the coolant stream flowing from the inlet in the distal portion of the clamp, through the coolant passage, and exiting the clamp at the outlet in the proximal portion of the clamp. In one embodiment, heat transfer structures may be provided within the coolant passage to promote heat transfer from the clamp to the coolant stream. For example, but not by way of limitation, a portion of the coolant passage in the clamp of the present invention may be threaded or otherwise machined to provide fins or other protruding structures within the coolant passage to increase the effective heat transfer area within the coolant passage across which heat is transferred from the clamp to the coolant stream while in use. It will be understood that such structures, if provided, should not compromise the capacity of the clamp to transfer force applied to the clamp by the fastener received through the aperture to the cutting insert engaged by the toe of the clamp of the present invention.

It will be understood that the coolant provided from the source of pressurized coolant, through the coolant source conduit to the coolant passage may be selected to maximize lubrication and heat prevention in the cutting insert. The coolant may also be selected for its heat carrying capacity, but the primary benefit is to minimize the amount of heat generated at the interface of the cutting edge of the cutting insert and the work piece. In one embodiment, the coolant comprises a water-based coolant including a lubricating substance or additive. Also, while embodiments of the clamp of the present invention illustrated in the appended drawings have a single outlet, it will be understood that other embodiments may include additional outlets from the coolant passage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A clamp to secure a cutting insert to a tool holder to remove material chips from a work piece, the clamp comprising:
    a proximal portion with a toe, a distal portion with a heel, a first lateral side, a second later side that is generally opposite the first lateral side, and an aperture therebetween to receive a fastener through the body to engage a hole in the tool holder, and a coolant passage including an inlet in the distal portion of the clamp to receive a flow of coolant from a coolant supply conduit, an outlet in a proximal portion of the clamp to direct a stream of coolant to impinge on a cutting interface between the work piece and a cutting edge of the cutting insert, and an intermediate channel passing laterally to the aperture;
    wherein the toe on the proximal portion of the clamp engages a receiving groove on the cutting insert to secure the cutting insert in position on the tool holder and against dislodgment from the forces applied by engagement of the cutting insert with the work piece;
    wherein the heel on the distal portion of the clamp engages a receiving détente on the tool holder to position the clamp relative to the tool holder;
    wherein the stream of coolant impinging on the work piece lubricates the cutting interface to reduce the heat generated at the cutting interface;
    wherein the inlet to the coolant passage is formed in the distal portion of the clamp intermediate a first lateral side of the claim and a generally opposite second lateral side of the clamp; and
    wherein an intermediate portion of the coolant passage passes between the first lateral side and the aperture of the clamp.

2. The clamp assembly of claim 1, wherein the inlet opens into the first lateral side.

3. The clamp assembly of claim 1, wherein the inlet opens into the second lateral side.

4. The clamp assembly of claim 1, wherein the inlet is threaded to enable threadable connection of the coolant passage of the clamp to the coolant supply conduit.

5. A clamp to secure a cutting insert to a tool holder to remove material chips from a work piece, the clamp comprising:
    a proximal portion with a toe, a distal portion with a heel, an aperture between the toe and the heel to receive a fastener through the body to engage a hole in the tool holder, and a coolant passage including an inlet in the distal portion of the clamp intermediate the first lateral side and the second lateral side to receive a flow of coolant from a coolant supply conduit, an outlet in a proximal portion of the clamp to direct a stream of coolant to impinge on a cutting interface between the work piece and a cutting edge of the cutting insert, an intermediate channel passing between the first lateral side and the aperture, and an initial channel between the intermediate channel and the inlet;
    wherein the toe on the proximal portion of the clamp engages a receiving groove on the cutting insert to secure the cutting insert in position on the tool holder and against dislodgment from the forces applied by engagement of the cutting insert with the work piece;
    wherein the heel on the distal portion of the clamp engages a receiving détente on the tool holder to position the clamp relative to the tool holder; and
    wherein the stream of coolant impinging on the work piece lubricates the cutting interface to reduce the heat generated at the cutting interface.

6. The clamp assembly of claim 1, wherein the intermediate channel is generally aligned with a well of the inlet.

7. The clamp assembly of claim 5, wherein the initial channel is at an acute angle to the intermediate channel.

8. The clamp assembly of claim 5, wherein the initial channel is perpendicular to the intermediate channel.

9. A clamp to secure a cutting insert on a tool holder to remove material chips from a work piece, comprising:
    a proximal portion with a toe;
    a distal portion with a heel;
    an aperture between the toe and the heel;
    a coolant passage having an inlet in the distal portion of the clamp, an outlet in the proximal portion of the clamp, and an intermediate channel between the inlet and the outlet and passing laterally to the aperture; and
    a second inlet to the coolant passage threaded to removably receive a plug to close the second inlet.

* * * * *